(12) United States Patent
Rodriguez et al.

(10) Patent No.: US 12,734,444 B2
(45) **Date of Patent: *Sep. 15, 2026**

(54) SYSTEM AND METHOD FOR INTEGRATING HUMAN-ONLY READABLE MEDIA INTO GAME PLAY

(71) Applicants: George Alexander Rodriguez, Miami, FL (US); Eder Daniel Moreira-Teixeira, Westworth Village, TX (US)

(72) Inventors: George Alexander Rodriguez, Miami, FL (US); Eder Daniel Moreira-Teixeira, Westworth Village, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/609,390

(22) Filed: Mar. 19, 2024

(65) Prior Publication Data

US 2024/0216806 A1 Jul. 4, 2024

Related U.S. Application Data

(63) Continuation of application No. 17/720,700, filed on Apr. 14, 2022, now Pat. No. 11,931,652.

(60) Provisional application No. 63/175,023, filed on Apr. 14, 2021.

(51) Int. Cl.
*A63F 13/537* (2014.01)

(52) U.S. Cl.
CPC .................................. *A63F 13/537* (2014.09)

(58) Field of Classification Search
CPC ......... A63F 13/537; A63F 13/52; A63F 13/53
See application file for complete search history.

(56) References Cited

U.S. PATENT DOCUMENTS 9,452,355 B1 * 9/2016 Lin ......................... A63F 13/53
11,609,652 B2 * 3/2023 Van Ostrand ....... G06F 3/04162
2007/0026372 A1 * 2/2007 Huelsbergen ............ G09B 7/00 434/322
2012/0246737 A1 * 9/2012 Paxton ............. G06F 16/24578 726/27
2016/0359990 A1 * 12/2016 Dabbiere ................ H04L 65/60
2019/0035208 A1 * 1/2019 Simons ............... G07F 17/3295
2019/0192977 A1 * 6/2019 Eatedali .................. A63F 13/35
2020/0257781 A1 * 8/2020 Paxton .................... G06F 21/32
2024/0321049 A1 * 9/2024 Idris ...................... A63F 13/655

* cited by examiner

*Primary Examiner* — Steve Rowland

(74) *Attorney, Agent, or Firm* — Javier Sobrado; The Brickell IP Group, PLLC

(57) ABSTRACT

A computer game system including a game screen, and a wager screen that includes controls that enable a player to select a wager amount for a competitive game and initiate a competitive game, such that the game screen is displayed when the competitive game is initiated. The player, upon winning the game, is awarded with at least a portion of the amount wagered by an opponent. The game developer that made the game is also awarded at least a portion of the amount wagered by the opponent. A device and non-transitory computer-readable medium having instructions to run such a system or a portion thereof.

20 Claims, 8 Drawing Sheets

100
105
104
106
59
seconds left
101
Avoid the Poison
the poison color is
102
103

205
204
Save the
Ghost
203
202
200
201

604a
605
604b
600
40
seconds left
603
Avoid the Poison
the poison color is
Left
607
601
602

707

SYSTEM AND METHOD FOR INTEGRATING HUMAN-ONLY READABLE MEDIA INTO GAME PLAY

CROSS REFERENCE TO RELATED APPLICATIONS

This application is a continuation of U.S. patent application Ser. No. 17/720,700, filed Apr. 14, 2022, which claims priority to U.S. Provisional Patent Application No. 63/175,023 filed Apr. 14, 2021, the entire contents of which are incorporated herein in their entirety.

FIELD OF THE INVENTION

The field of the disclosed concepts relates to video game, and in particular games of skill played competitively.

BACKGROUND OF THE INVENTION

Many systems allow video games to be played competitively, whether for bragging rights, prizes, rankings or money. However, absent live monitoring of an event, competitive games are susceptible to cheating by having players run bots to control the game play and to give the cheating player an advantage over the human player. Most solutions focus on bot detection software for identifying players running bots, such as monitoring the timing of inputs, running searches for known cheating programs, etc. However, bot programs have adapted to such bot detection mechanisms and continue to be a problem.

Human-only readable media, such as a CAPTCHA may be used to ensure that a human is at the controls of a game at the start, but once the game has begun the player may turn on a bot to play for him while the player monitors game play.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

In certain embodiments a computer game system may include a game screen that may have at least one game play element, and at least one human-only readable medium, such that the human-only readable medium displays information about the at least one game play element instructing a player how to successfully accomplish a game task.

In certain embodiments a device may include a processor and a display wherein the display may include a game screen that may have at least one game play element, and at least one human-only readable medium, such that the human-only readable medium displays information about the at least one game play element instructing a player how to successfully accomplish a game task.

In certain embodiments a non-transitory computer-readable medium comprising a set of instructions that when executed by a processor cause the processor to display a game screen that may have at least one game play element, and at least one human-only readable medium, such that the human-only readable medium displays information about the game play elements instructing a player how to successfully accomplish a game task.

In certain embodiments a system for competitive game play may include a client application that may run on a player's computing device that presents a player with controls that enable the player to select a wager amount for a competitive game and initiate a competitive game. The game may include a game screen that may have at least one game play element, and at least one human-only readable medium, such that the human-only readable medium displays information about the at least one game play element instructing a player how to successfully accomplish a game task.

BRIEF DESCRIPTION OF THE DRAWINGS

The drawings set forth exemplary embodiments of the disclosed concepts, and are not intended to be limiting in any way.

DETAILED DESCRIPTION OF THE DISCLOSURE

Figure 1:
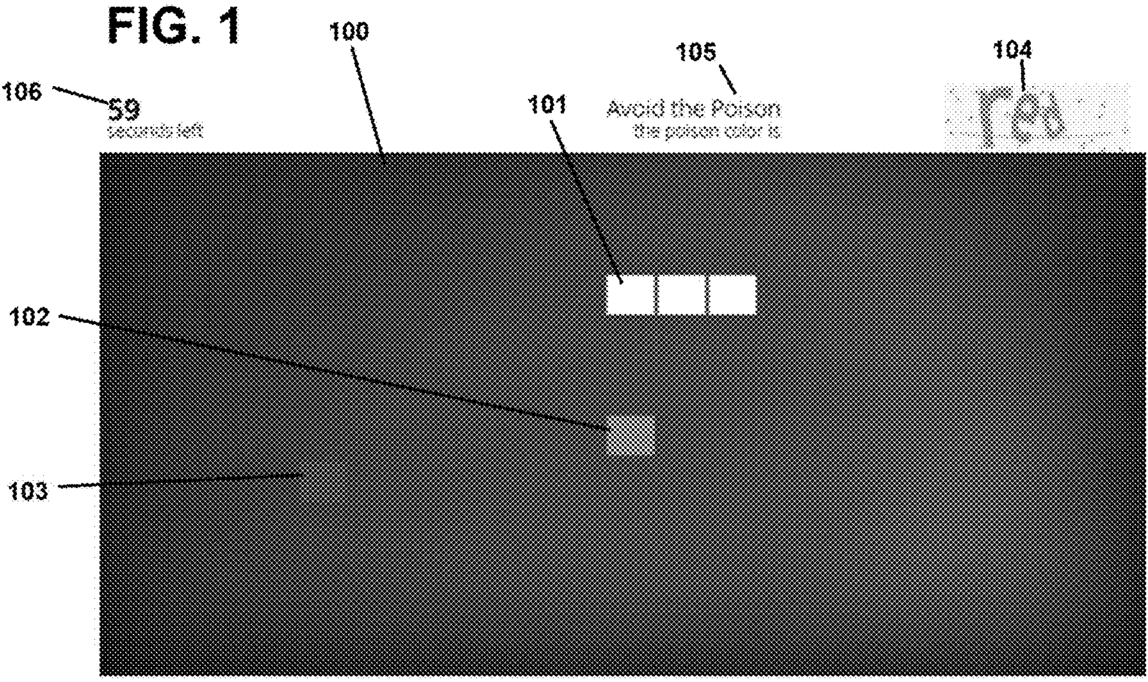
FIG. 1 illustrates a "Snake" game system in accordance with the disclosed concepts.

The following detailed description and the appended drawings describe and illustrate exemplary embodiments solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

As used herein, the terms "human-only readable medium" and "human-only readable media" are defined to mean an image, video, graphic, or sound that conveys a message to a human being that is difficult for a computer program to understand or interpret. This includes, but is not limited to CAPTCHAs, symbols, math equations, word problems, image relationships (for example: pilot/plane), honeypot (fake or invisible instructions to trick bots), biometric captchas (including unlocking information in the captcha via fingerprints or other biometric data).

In certain embodiments a computer game system may include a game screen that may have at least one game play element, and at least one human-only readable medium, such that the human-only readable medium displays information about the at least one game play element instructing a player how to successfully accomplish a game task.

In certain embodiments a device may include a processor and a display wherein the display may have a game screen that may have at least one game play element, and at least one human-only readable medium, such that the human-only readable medium displays information about the at least one game play element instructing a player how to successfully accomplish a game task.

In certain embodiments a non-transitory computer-readable medium comprising a set of instructions that when executed by a processor cause the processor to display a game screen that may include at least one game play element, and at least one human-only readable medium, such that the human-only readable medium displays information about the game play elements instructing a player how to successfully accomplish a game task.

In certain embodiments the at least one human-only readable medium may be displayed adjacent to the game screen. In certain embodiments the at least one human-only readable medium may be displayed within the game screen. In certain embodiments the at least one human-only readable medium may be displayed within, and adjacent to, the game screen. In certain embodiments the at least one human-only readable medium may play a sound. In certain embodiments, the at least one human-only readable medium may display an image.

In certain embodiments the at least one game play element comprises a first game play element. In certain embodiments the at least one human-only readable medium may identify the first game play element as one to be collected by the player. In certain embodiments the at least one human-only readable medium may identify the first game play element as one to be avoided by the player. In certain embodiments the at least one human-only readable medium may identify the first game play element as one to be targeted by the player. In certain embodiments the at least one human-only readable medium may identify the first game play element as one to be destroyed by the player. In certain embodiments the at least one human-only readable medium may identify the first game play element as one to be built by the player. In certain embodiments the at least one human-only readable medium may identify the first game play element as one to be interacted with by the player.

In certain embodiments instructions may be provided to give a player information about the relationship between the at least one game play element and the at least one human-only readable medium. In certain embodiments the instructions may be shown adjacent to the at least one human-only readable medium. In certain embodiments the instructions may direct a player to collect a game play element. In certain embodiments the instructions may direct a player to avoid a game play element. In certain embodiments the instructions may direct a player to target a game play element. In certain embodiments the instructions may direct a player to build a game play element. In certain embodiments the instructions may direct a player to interact with a game play element.

In certain embodiments the game screen may be of a snake game. In certain embodiments the game play elements may be a food pellet. In certain embodiments the game play elements may be a poison pellet. In certain embodiments the at least one human-only readable medium may identify the food pellet. In certain embodiments the at least one human-only readable medium may identify the poison pellet. In certain embodiments the human-only readable medium may identify the location of wall game play element, of the at least one game play element, that is not otherwise known.

In certain embodiments the game screen may be of a puzzle game. In certain embodiments the at least one human-only readable medium may identify a relationship between game play elements, such as a first and second game play element, necessary to solve a puzzle.

In certain embodiments the game screen is a shooting game. In certain embodiments the at least one game play element may be a target. In certain embodiments the game play elements may be items. In certain embodiments the at least one human-only readable medium may identify the target as one to be targeted. In certain embodiments the at least one human-only readable medium may identify the target as one to be avoided. In certain embodiments the at least one human-only readable medium may identify the item as one to be collected. In certain embodiments the at least one human-only readable medium may identify the item as one to be avoided.

In certain embodiments the game screen may be of a card game. In certain embodiments the human-only readable medium may identify card values that are substituted. In certain embodiments the human-only readable medium may identify card values that are swapped. In certain embodiments the human-only readable medium may identify wild cards.

In certain embodiments the game may be a racing game. In certain embodiments the game play element may be a power-up. In certain embodiments, the game play element may be a handicapping item. In certain embodiments the human-only readable medium may identify the power-up. In certain embodiments the human-only readable medium may identify the handicapping item.

In certain embodiments the game may be an action game. In certain embodiments the game play element may be a first and second weapon and an enemy. In certain embodiments the game play element may be a first and second armor and an enemy. In certain embodiments the human-only readable medium may identify which of the first and second weapon to use against the enemy. In certain such embodiments the human-only readable medium may identify which of the first and second armor to use to defend against the enemy.

In certain embodiments an overlay may be provided. In certain embodiments the overlay may show a wall that is not otherwise displayed on the game screen. In certain embodiments the overlay may show an image that is not otherwise shown on the game screen. In certain embodiments the overlay may show a game play element that is not otherwise shown on the game screen. In certain embodiments the overlay may display a human-only readable medium. In certain embodiments the overlay may display instructions.

Certain embodiments may further include a wager screen that may include controls that allow the player to select a wager amount for a competitive game and to initiate the competitive game such that the game screen is displayed when the competitive game is initiated. Certain embodiments may further include a ranking system such that player may have a player ranking. In certain embodiments the match making system may match the player with an opponent having a respective ranking that is similar to the player ranking of the player. In certain embodiments the player, upon winning the game, may be awarded with at least a portion of the amount wagered by the opponent.

In certain embodiments a system for competitive game play may include a client application that may run on a player's computing device that presents a player with controls that enable the player to select a wager amount for a competitive game and initiate a competitive game. The game may include a game screen that may have at least one game play element, and at least one human-only readable medium, such that the human-only readable medium displays information about the at least one game play element instructing a player how to successfully accomplish a game task. In certain embodiments the competitive game may be from a developer, and at least a portion of the amount wagered by the opponent may be awarded to the developer.

In certain embodiments the player may wager money. In certain embodiments the player may wager an amount of crypto currency tokens. In certain embodiments the player may wager points. In certain embodiments a match making system may be provided to match the player against an opponent. In certain embodiments the player may have a ranking. In certain embodiments the match making system may match the player with an opponent having a respective ranking that is similar to the ranking of the player. In certain embodiments the winning player may be awarded with at least a portion of the amount wagered by the losing player.

In certain embodiments the system may allow games from game developers. In certain embodiments at least a portion of the amount wagered by the losing player may be awarded to the game developer.

A device may include a processor and a display, wherein the processor and display may run any of the systems and games described above.

A non-transitory computer-readable medium comprising a set of instructions that when executed by a processor may cause the processor to run the any of the systems or games described above.

The disclosed concepts deal with linking one or more human-only readable media, such as a CAPTCHA, to one or more a game play element in order to put computerized bots at a disadvantage in playing against human players. For example, a human-only readable medium may display a color, shape, or number, together with instructions that relate that color, shape or number to a game play element displayed on a game screen so that a player knows how to properly interact with the game play elements to succeed at a game task, while a computer bot should fail at reading the human-only readable medium and will be playing the game without information crucial to success. In this manner, bots should consistently fail and lose to human players allowing human players to compete with a lessened risk that others will be cheating by using bots. The human-only readable medium may be a CAPTCHA, a specially prepared graphic, a sound, or any other suitable medium that is simple for a human to understand but that is difficult for a computer or bot program to decipher. When a player has accomplished one or more gameplay tasks (such as collecting an item or pellet, or attacking a particular target, or any other suitable task) in accordance with the human-only readable medium, a new human-only readable medium may be displayed to provide the player with new information relevant to game play.

The disclosed concepts may include instructions that explain how the information provided by the human-only readable medium is to be used. For example instructions may inform a player what game play elements to interact with or collect, and which to avoid or destroy.

A game play element may be anything that provides information to a user or that the user interacts with in playing the game in order to achieve game play objectives. Persons of skill in the art will recognize that the game play elements may vary drastically depending on the type of game. Shooter games may have target game play elements and object game play elements; card games may have card game play elements and rule game play elements; RPG games may have item game play elements, weapon game play elements, etc.

For example, FIG. 1 illustrates an exemplary “snake”-style game in accordance with the disclosed concepts. In a snake style game a player controls a snake that cats food and grows longer with every successful “feeding.” The player must avoid having the snake crash into itself, which becomes increasingly more difficult as the snake gets longer. Additionally, some versions of the game also introduce hazards that must be avoided by the player in order to succeed. Score may be kept by how long the snake gets, how long the game is played, how much food the player cats, by a combination of such metrics, or in any other suitable way.

As shown in FIG. 1, a game play screen 100 may include several game play elements, including the player/snake 101, a first pellet having a first color 102, and a second pellet having a second color 103. A human-only readable medium 104 may be included adjacent to the game screen, together with instructions 105 relating the human-only readable medium to a game play element. For example, in FIG. 1, the first pellet is red and the second pellet is orange. The instructions 105 notify the player that the human-only readable medium 104 is identifying the “Poison”—a hazard to be avoided by the player. The human-only readable medium 104 in FIG. 1 is in image of the word “red.” Thus a human player playing the game can look at the instructions and the human-only readable medium and know that he must avoid the red pellets and therefore, that he should eat the orange pellets. In contrast, a bot playing the game will not be able to consistently read the human-only readable medium, and thus will eventually eat the wrong pellet and face the consequences—which may include damaging the snake/player, killing the snake or ending the game, or any other suitable consequences given the implementation of the game.

The human-only readable medium 104 may be shown in the proximity of the game screen 100. As shown in FIG. 1, that human-only readable medium 104 may be shown adjacent to the game screen 100. Alternatively, the human-only readable medium 104 may be shown within the game screen 100.

The instructions 105 may be shown in the proximity of the human-only readable medium 104. In some embodiments, the instructions may be provided to the player prior to the beginning of the game so that instructions do not need to be displayed during the game. For example, the player may begin the game with the understanding that the human-only readable medium 104 will always be instructing the player what the “food” is to be collected, or what the “poison” is to be avoided.

The game screen may periodically change the human-only readable medium so that another color is the “poison” and/or may periodically change the instructions to identify the “food” rather than the “poison.” For example the colors of the pellets may change every time that the player cats the food, and a new human-only readable medium may replace the old one every time there is such a color change. Alternatively the human-only readable medium 104 may change while the colors stay the same, or the instructions 105 may change while the human-readable medium 104 stays the same. The human-only readable medium 104 may change in a predictable way (every X pellets or after X seconds of game time) or randomly. Persons of skill in the art will recognize that in addition to color, the game play elements may vary by shape, may include symbols, numbers. Thus, the human-only readable medium 104 may identify the "poison" or the "food" for games like the one shown in FIG. 1 by any such feature. The instructions may also be phrased in different ways so that a human player will understand them easily while a bot may have trouble deciphering what is meant. For example, the instructions 105 may specify "The Food is:" while the human-only readable medium 104 may display "Blue"; or the instructions 105 may specify "Avoid:" while the human-only readable medium 104 displays "Circles" or the instructions 105 may instruct the player to "Collect" while the human-only readable medium 104 may display "Apples", and so on.

Figure 2:
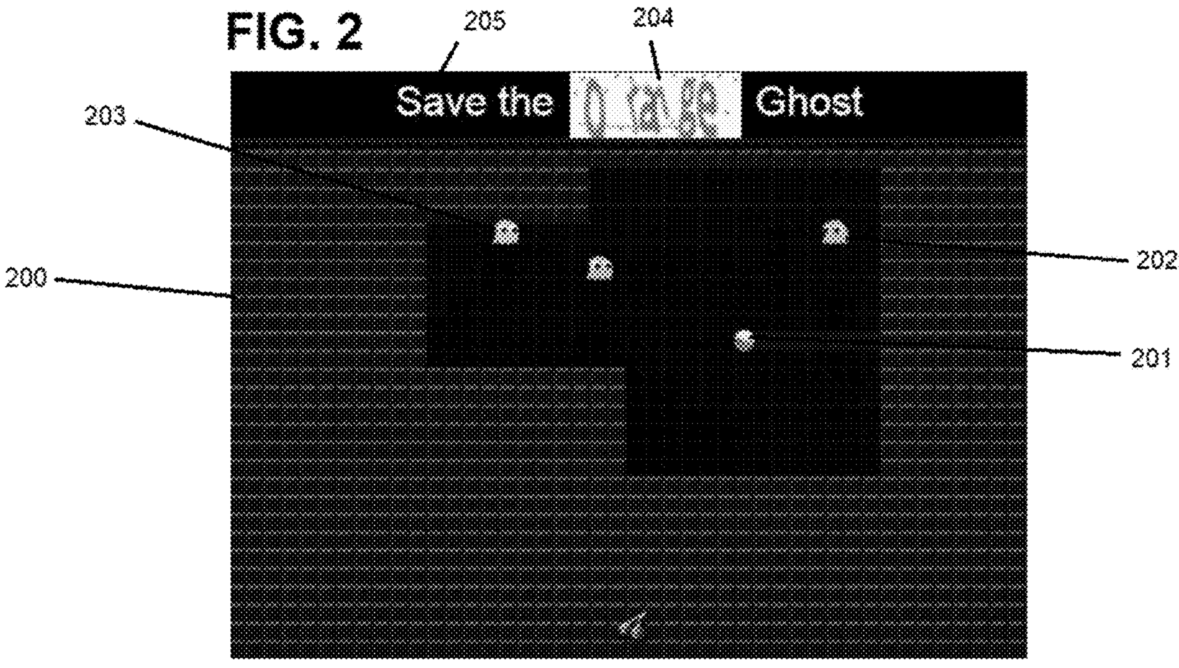
FIG. 2 illustrates a "Pac-Man"-style game in accordance with the disclosed concepts.

FIG. 2 illustrates a PacMan-style game. The game may have a game screen 200, with several game play elements, including the player 201, at least one pink ghost 202 and an orange ghost 203. Again a human-only readable medium 204 identifies a feature of a game play element, in this case the color "Orange" and instructions 205 inform the player as to how to interact with that gameplay element in order to successfully accomplish a game task—in FIG. 2 the player is instructed to "save" the ghost identified by the human-only readable medium 204, while in other instances the game may instruct the player to "kill", "eat", or "avoid" the ghosts identified by the human-only readable medium. Alternatively for a "PacMan"-style game, the game may feature multiple colored or shaped "power" pellets, and the human-only readable medium 204 and instructions 205 may inform the player which color "power" pellets are active and which are inert. Alternatively, the game may feature multiple types of "bonus" fruit, cherry, oranges, etc., and the human-only readable medium 204 and instructions 205 may inform the player which "bonus" fruit are active, or which are poisonous.

Figure 3:
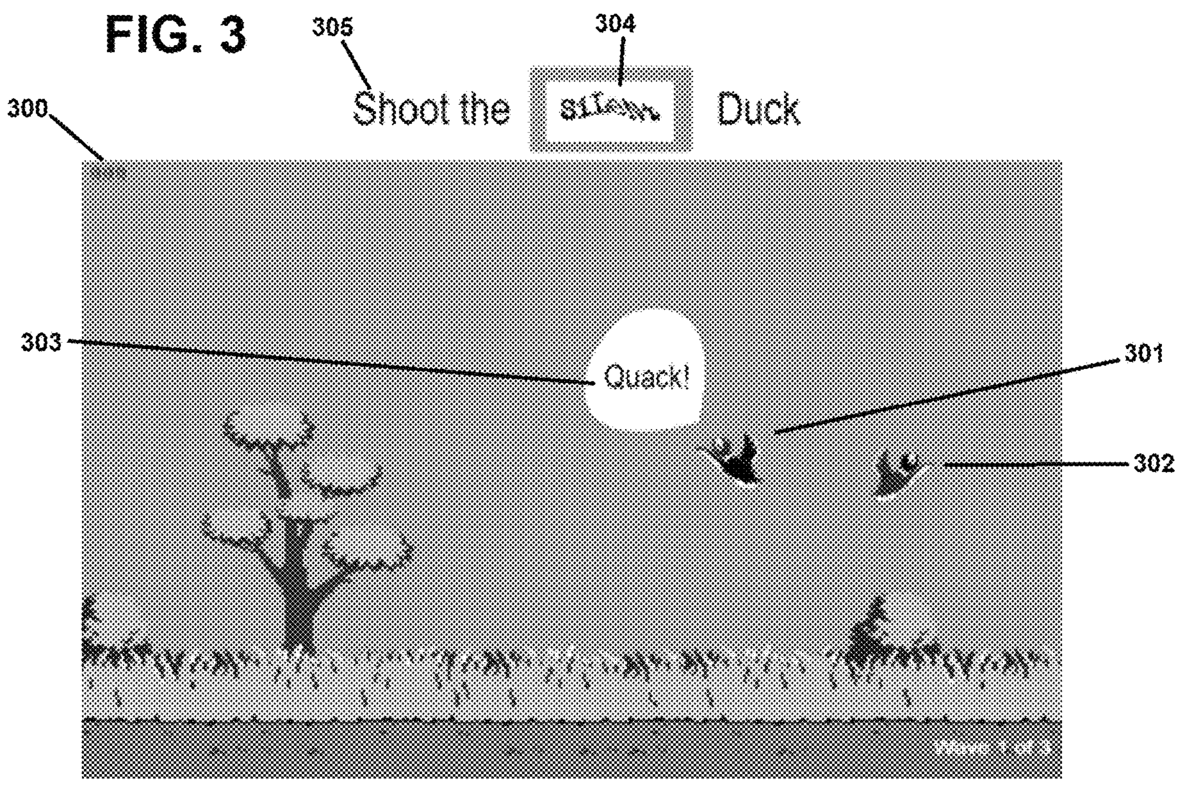
FIG. 3 illustrates a "Duck Hunt"-style game in accordance with the disclosed concepts.
Figure 4:
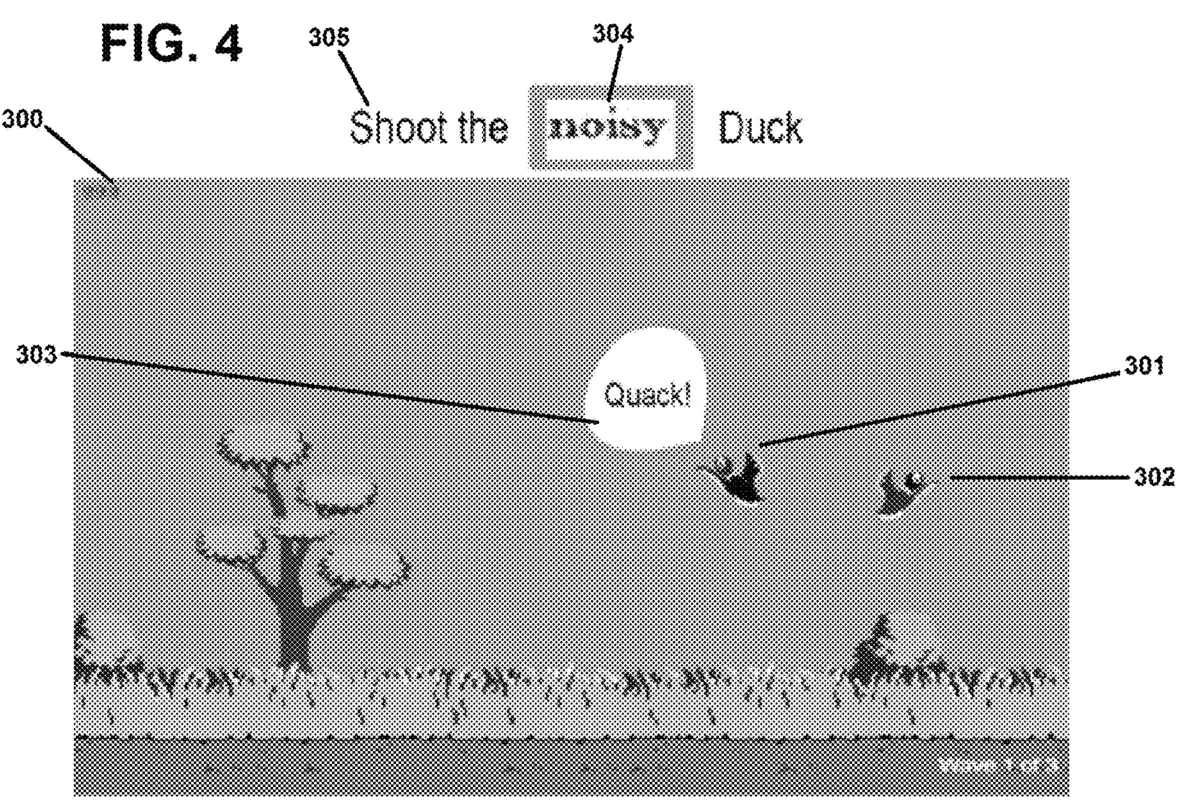
FIG. 4 illustrates a "Duck Hunt"-style game in accordance with the disclosed concepts.

FIGS. 3 and 4 illustrate a "Duck Hunt"-style game where the player is instructed by the human-only readable medium 304 and instructions 305 which duck he should shoot in order to succeed at the game. A game screen 300 may include game play elements including a black duck 301, a brown duck, 302, and a noise indicator 303. In FIG. 3 the player is instructed to shoot at the "silent" duck while in FIG. 4 the player is instructed to shoot at the "noisy" duck. The noise indicator 303 game play element may be a text bubble, as illustrated, an animation or graphical representation of noise, or any other suitable game play element that indicates to the player which duck is making noise such that the player can understand how to accomplish the goal set out by the instructions 305 and human-only readable medium 304.

Figure 5:
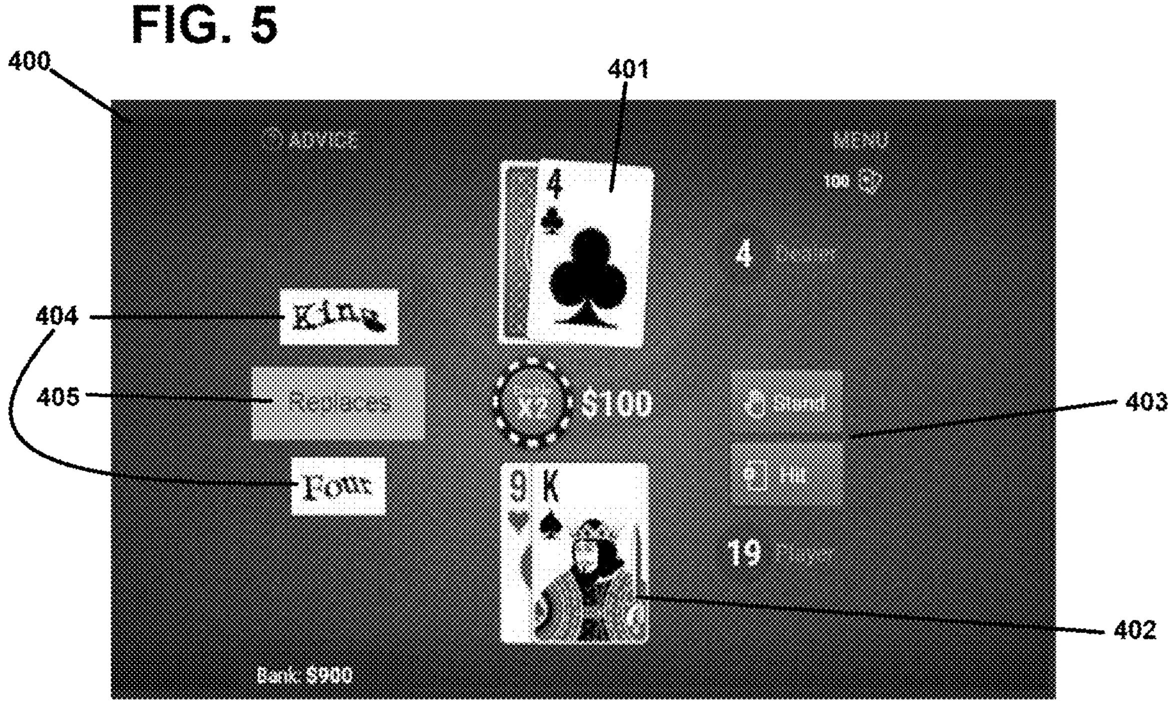
FIG. 5 illustrates a card game in accordance with the disclosed concepts.

FIG. 5 illustrates a "black jack"-style card game in accordance with the disclosed concepts where a game screen 400 shows the card game with various game play elements in the form of cards 401, 402 and betting instructions 403. The instructions 404 and human-only readable medium 405 provide the player with game play information that affect decision making. For example in FIG. 5, the instructions 405 and human-only readable medium 404 tell the player that the dealer's up card is a king, not a four as shown. As shown in this exemplary embodiment, the human-only readable 404 may be displayed and/or integrated with the game screen 400, and need not be separate from it (as shown in FIGS. 1-4). Additionally, the information provided by the instructions need not have an effect in every instance—for example the optimal betting strategy for a player's hand of 19 in a blackjack game is to stand regardless of whether a 4 or a king is showing. However, in other instances, such as when a player has a pair of sixes, it may be the difference between whether a four or a king is showing may change a player's strategy to hit, stand or split.

Figure 6:
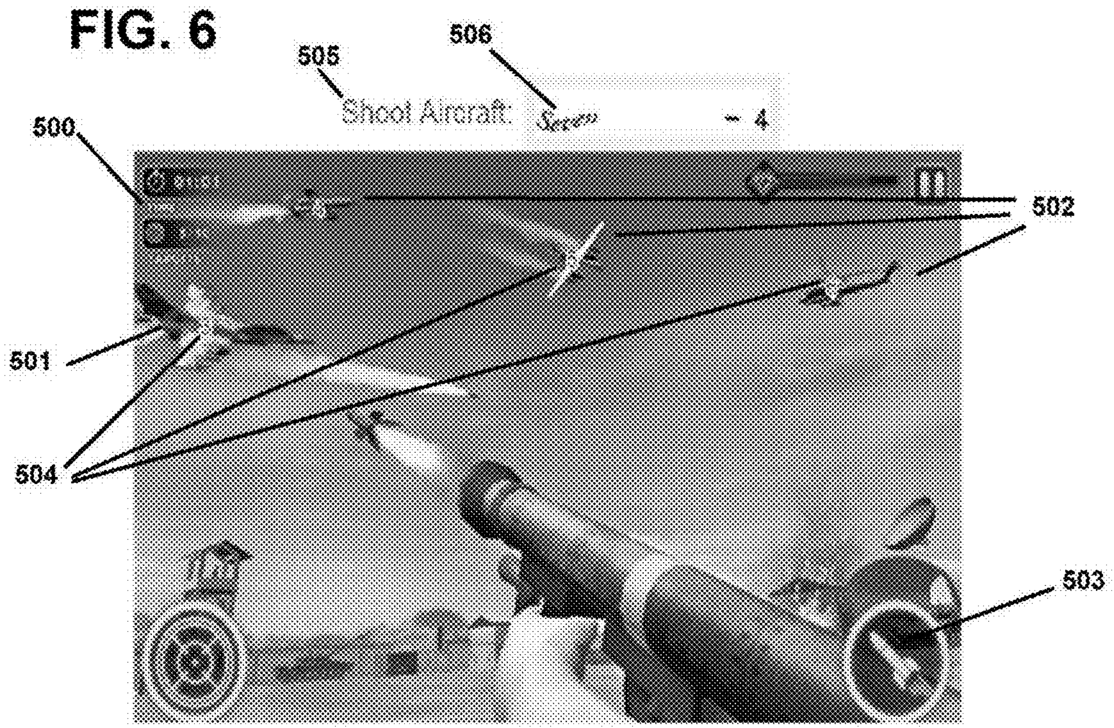
FIG. 6 illustrates a shooter-style game in accordance with the disclosed concepts.

FIG. 6 illustrates a shooter-style game where a game screen 500 shows several game play elements, including aircraft 501, 502, and the active weapon 503. The instructions 505 and human-only readable medium 506 instruct the player to shoot the aircraft that matches the equation "7-4", or aircraft 501 that has been provided with an identifier 504 of "3". Identifiers may be symbols, letters, numbers, shapes, or any other suitable identifier that may be identified by the human-only readable medium 506. In this exemplary embodiment, a simple math equation has been added which has a minor impact on a human being's game play, but further complicates the task of deciphering the goal set out by the instructions 505 and human-only readable medium 506. The instructions 505 and human-only readable medium 506 may alternate between providing such math equations, and providing simple instructions, such as the number or type of aircraft to shoot. Alternatively, the system in this embodiment could incorporate the weapon game play element 503 by providing instructions 505 to "Use Weapon" and using the human-only readable medium 506 to identify the weapon to be used, alternating between such instructions and the math equation instructions shown in FIG. 6.

Figure 7:
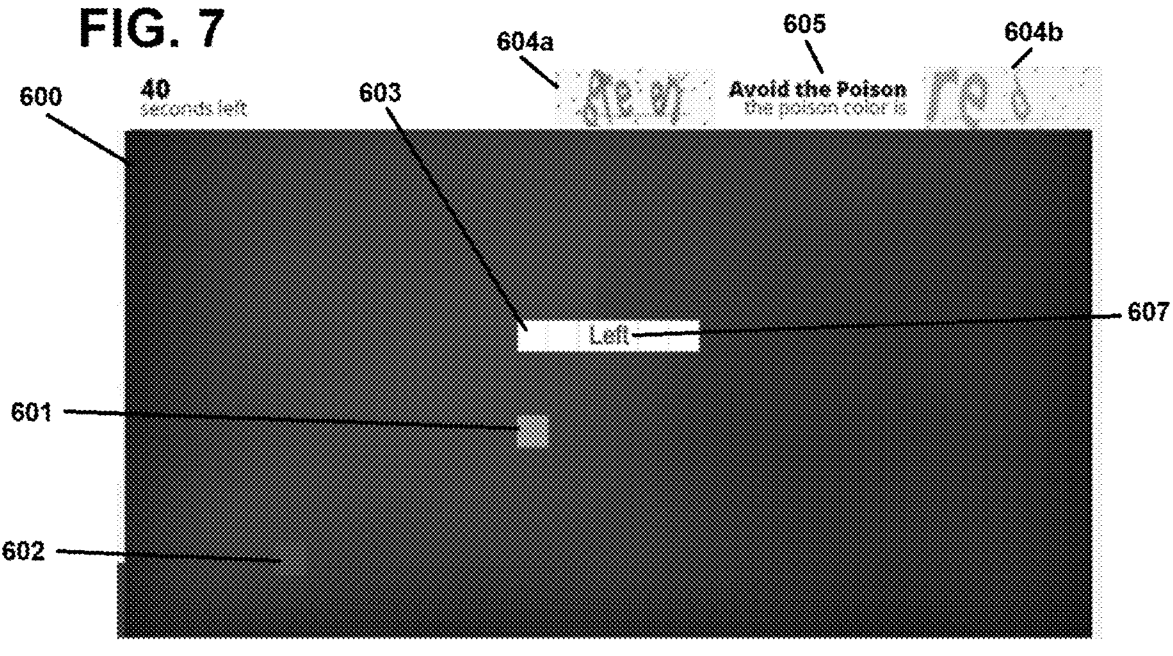
FIG. 7 illustrates a "Snake" game system in accordance with the disclosed concepts.

FIG. 7 illustrates another version of the snake-style game with multiple human-only readable media **604*a*, 604*b*, and an overlay 607 providing additional game information. As with FIG. 1, FIG. 7 illustrates game play elements featuring differently colored foods 601, 602, the player-controlled snake 603. In this embodiment there are two human-only readable media 604*a*, 604*b*, and a single set of instructions 605. A text overlay 607 may be provided, in this case over the snake game play element 603 or in the center of the screen or in some other location, to instruct the player as to which of the two human-only readable media 604*a*, 604*b* is providing the correct information. Here the text overlay indicates that the "LEFT" instruction is correct, indicating that the "poison" is the green game play element 601, and thus the player should avoid the green element 601 and eat the red element 602. This overlay 607** may be provided within the game environment, or external to it (as text, as a sound, as an image or graphic, or as a third human-only readable medium).

Figure 8:
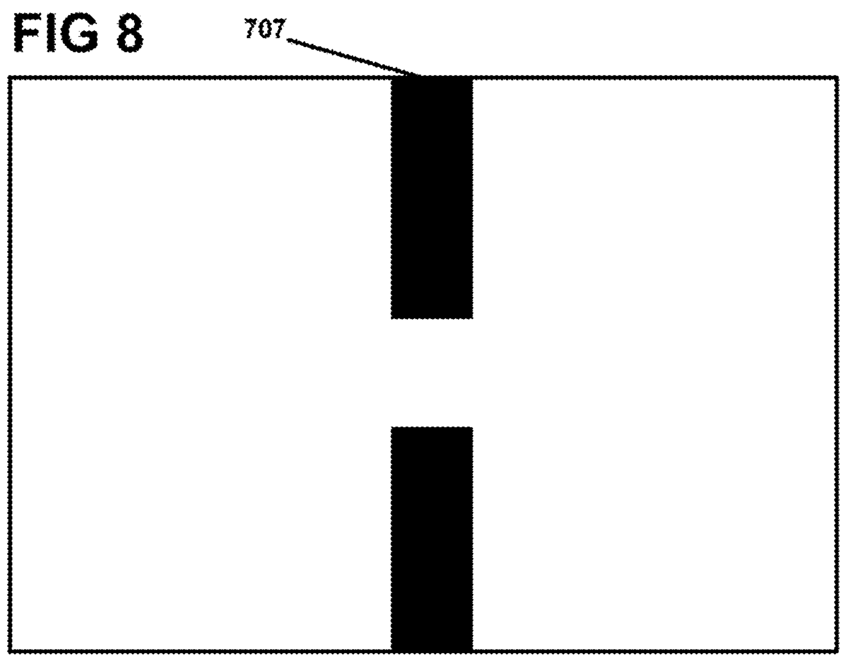
FIG. 8 illustrates an image overlay that may be presented to a user over a game screen in accordance with the disclosed concepts.

FIG. 8 illustrates an image overlay 707 that may be used with the disclosed concepts. The image overlay 707 may inform the player of an obstacle in the game that is programmed into the game code, but that is not displayed via the game screen. The overlay may be separate from game play and may be displayed as a graphic or pop-up over the game screen. In this manner any bot monitoring the feed from the game may not know to monitor the web site or app that is displaying the game screen.

Figure 9:
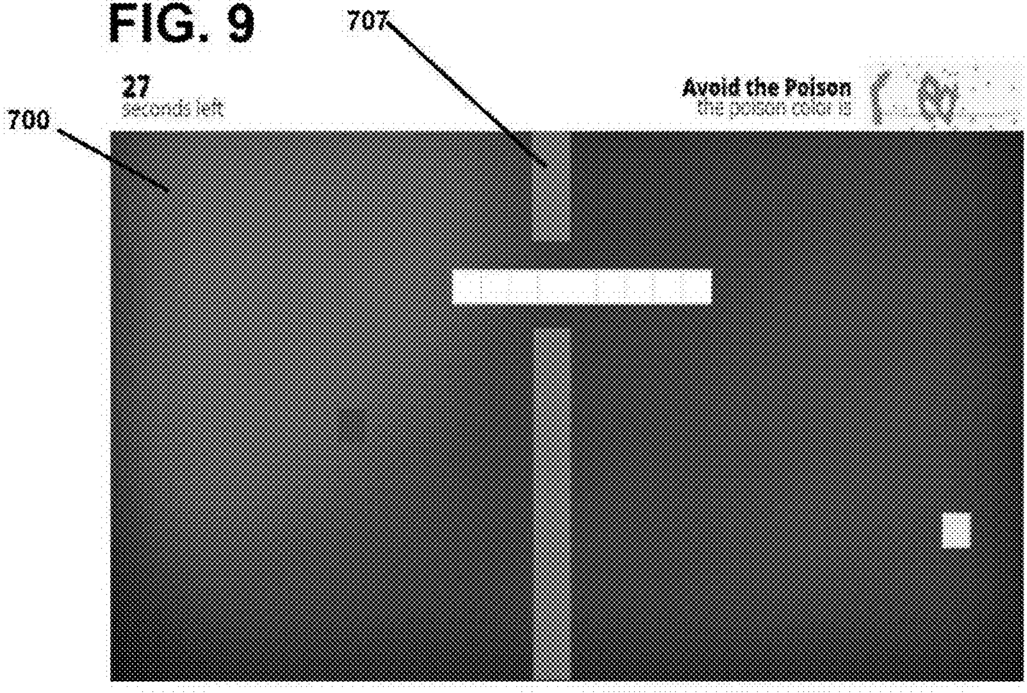
FIG. 9 illustrates a "Snake" style game system with the overlay of FIG. 8, in accordance with the disclosed concepts.

FIG. 9 illustrates a snake-style game with the image overlay 707 similar to that shown in FIG. 8 drawn over the game screen 700. The overlay 707 provides additional barriers that a player will instantly recognize as hazards to be avoided, but a bot may have more difficulty in deciphering the nature of the image overlay. Image overlays of the type described may be used in any style of game, and may provide a human player with information that is crucial to success in the game, or otherwise give a human player that can understand the image an advantage over a bot player that cannot process the image.

Figure 10:
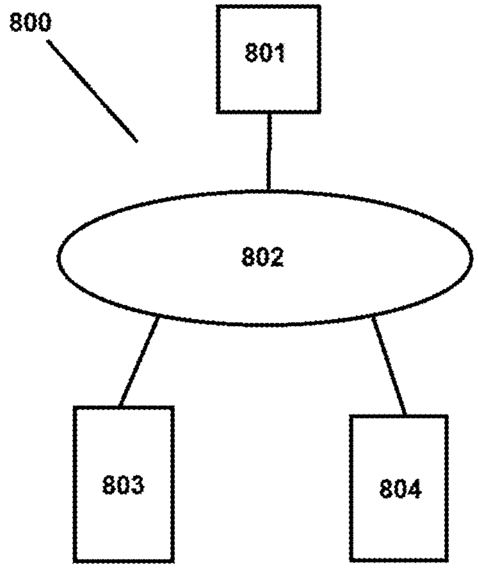
FIG. 10 illustrates a system for competitive game play in accordance with the discloses concepts.

FIG. 10 illustrates a system 800 for competitive game play in accordance with the disclosed concepts where players wishing to compete against one another contact an application server 801 with their computing devices 803, 804 via a network 802, such as the Internet. The application server 801 may be centralized or decentralized, and may utilize block chain technology to record transactions and game results. It may feature a match making service to match up players of similar skill level to ensure competitive play. It may keep a skill rating for players, such as an ELO rating, a win-loss percentage, or other suitable metric. It may also store data about a player's history and performance, including number of games played, number of games won, details about the length of match, list of past opponents, amount of points earned, amount of money bet money won, etc. The application server may also store information transmitted by players during game play to detect cheating by the players, or evaluate game play and function.

Player computing devices 803, 804 may be any suitable device capable of running the game and connecting to the competitive play system 800. The connecting network may be a specialized network, a VPN, the Internet, a LAN, or any other suitable network that can facilitate communication between the application server 801 and the player computing devices 803, 804.

The application server 801 may allow players to wager on the outcome of their game, with each player betting an amount of money, crypto currency tokens, in-game currency or points, or any other wagerable item, against the other player where the winner of the competitive game between the players gets at least a portion of the amount of the wager bet by the other player. The system may also reward players with points, cryptocurrency tokens, or any other suitable reward for each bet made, for the amount wagered, for each game played, or any other suitable reward system. Players that receive such reward or reward tokens may sell them to others, may hold them, or may stake them, purchase prizes with them, or use them within any other suitable reward system. The system 800 may include a reward system that pays a portion of the amount wagered by the losing player to reward token holders or to players who have staked their reward tokens. The system 800 may allow game developers to submit games to be played on the competitive game system and may reward such game developers by providing them at least a portion of the amount wagered by the losing player.

Figure 11:
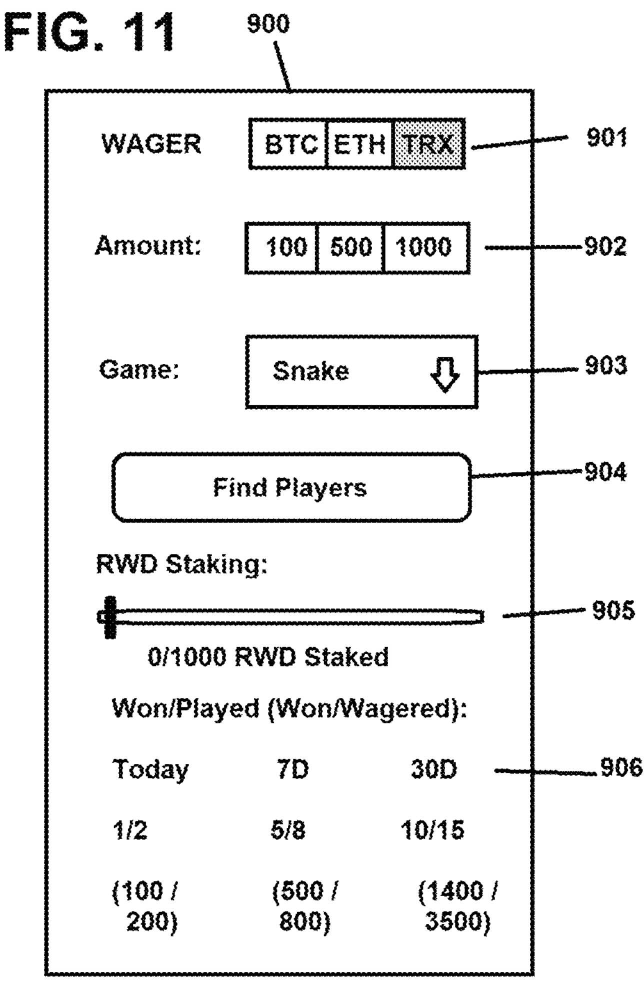
FIG. 11 illustrates an interface for a competitive game system in accordance with the disclosed concepts.

FIG. 11 illustrates an exemplary interface 900 that client application running on a player computing device 803, 804 may present to the player. Interface 900 may include a token selection input 901 to allow a player to select which cryptocurrency token they wish to wager. Interface 900 may include an amount input: 902 which may allow a player to select an amount to wager. The player may write in a maximum amount to wager or may select from one of several options presented. Interface 900 may include a game selection input 903 to allow a player to select from a number of games that are available to be played. Interface 900 may provide a "find players" button 904 that the player can select to begin searching the system for another player willing to play with the game and wager settings. Interface 900 may include a staking control input 905 allowing the player to control how much of his free reward ("RWD") tokens they wish to stake. Interface 900 may provide a statistics panel so that the player can see at a glance how much they've won/wagered over several time periods. Persons of skill in the art will recognize that these are just a few of numerous options for wagering and statistics that an interface may present to a player to allow them to control the manner of their participation in competitive gaming within the scope of the disclosed concepts. Other forms which are contemplated include but are not limited to: allowing multiple selections of tokens, wager amounts and games, to facilitate finding matches; allowing controls to restrict the level of competition a player is comfortable with (for example, using ELO ratings: unrated; 1000-1200; 1201-1400; etc.).

Figure 12:
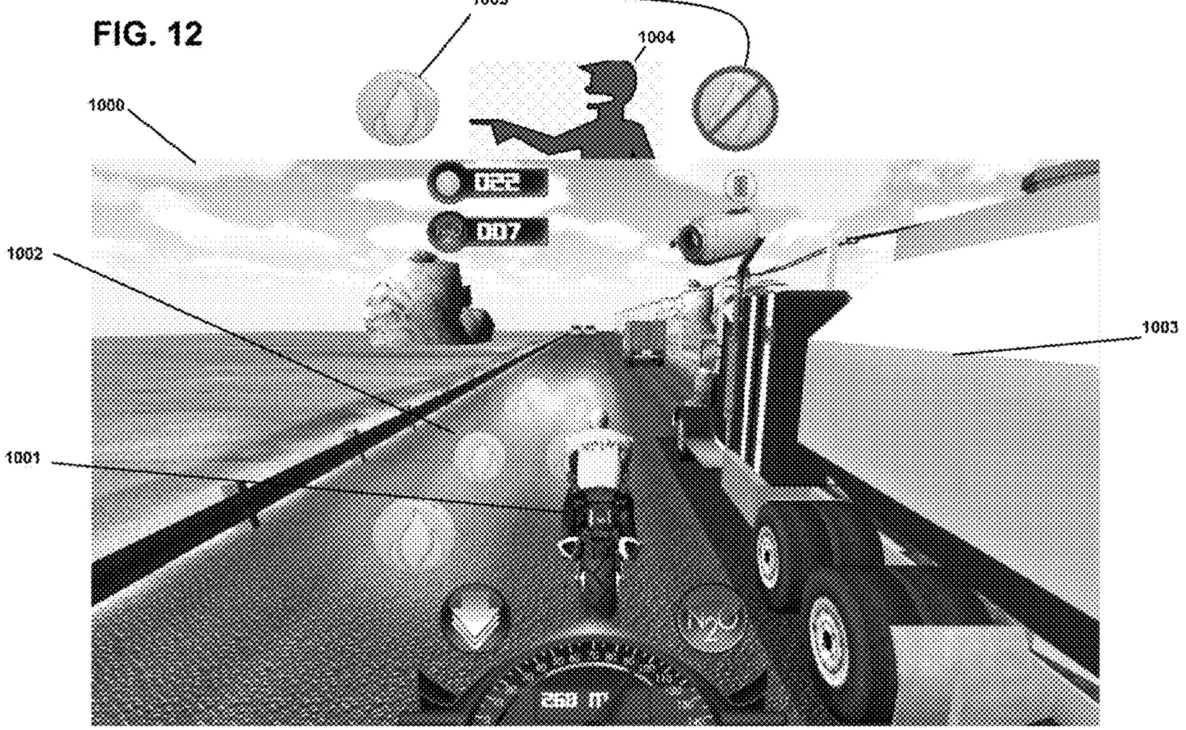
FIG. 12 illustrates a racing-style game in accordance with the disclosed concepts.

FIG. 12 illustrates a racing-style game where a game screen 1000 shows several game play elements, including the player's racer 1001, coins 1002, and obstacle trucks 1003. This embodiment shows two sets of instructions 1005, where one instructs a player to collect coins while racing and the other instructs the player to avoid coins while racing. The human-only readable medium 1004 may be an image of a man pointing at one or the other of the instructions in order to instruct the player to collect or avoid the coin game play elements 1002.

Figure 13:
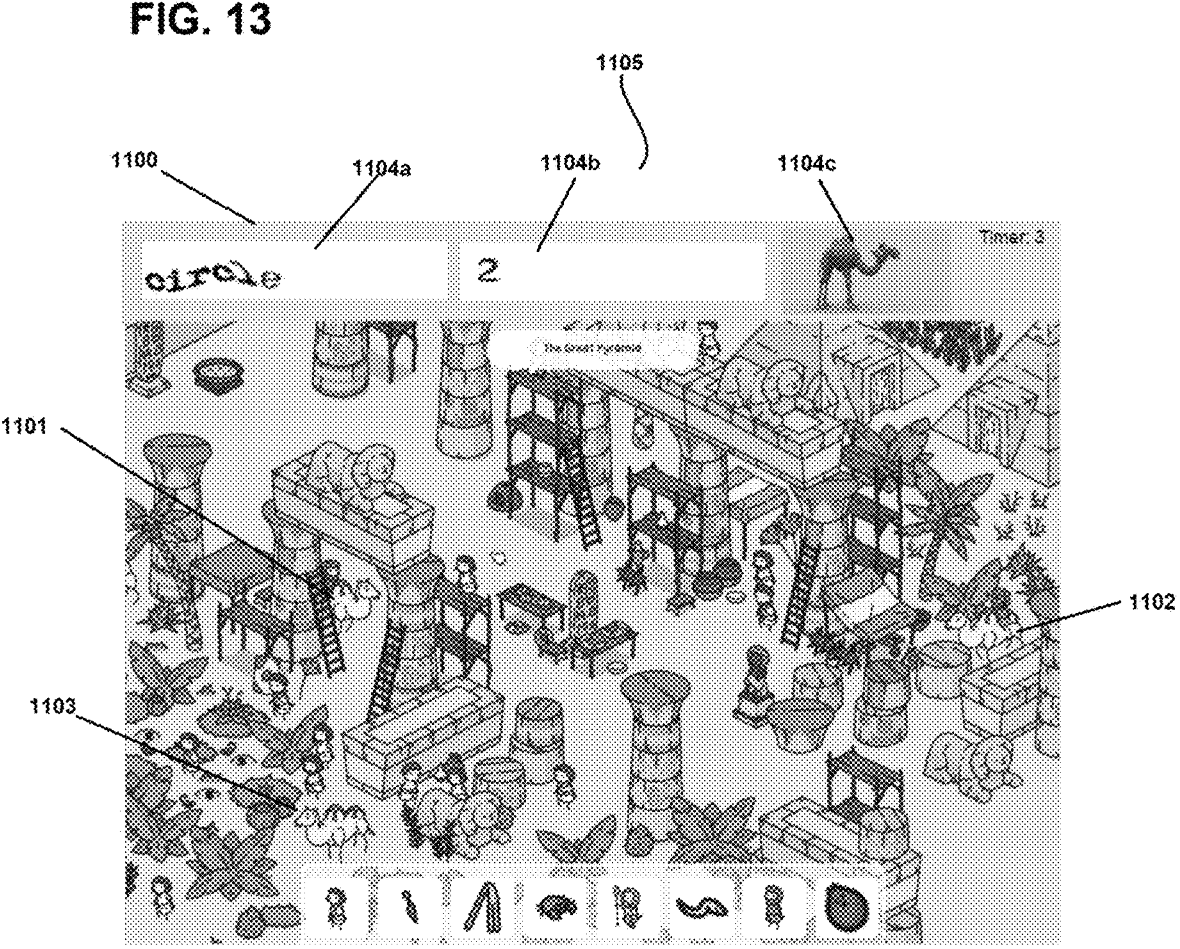
FIG. 13 illustrates a puzzle-style game in accordance with the disclosed concepts.

FIG. 13 illustrates a puzzle-style game where a game screen 1100 shows several game play elements, including camels 1101, 1102, 1103. This embodiment shows three human-only readable media 1104*a*, 1104*b*, 1104*c*, which collectively provide instructions 1105 to the player instructing the instruct the player to "Circle two camels." The first human-only readable medium 1104*a* provides a CAPTCHA of the word "CIRCLE", the second human-only readable medium 1104*b* shows a CAPTCHA of the number "2", and the third human-only readable medium 1104*c* shows an image of a camel that is different from the camels that are drawn in the puzzle. When the player accomplishes the task the game may provide new human-only readable media 1104*a*, 1104*b*, 1104*c*, and new instructions 1105, and/or may advance to another puzzle. Alternative instructions can ask the player to find and interact with other game play elements, provide information about the order in which puzzle pieces have to be interacted with, or inform the player of information regarding puzzle game play elements that are not visible on the screen.

Persons of skill in the art will recognize that any of the features of the disclosed concepts may be implemented with any suitable game to make it more difficult for bots to do well, while allowing players to wager and/or compete in such games with higher confidence that their opponents are human While specific embodiments have been discussed to illustrate the invention, it will be understood by those skilled in the art that the descriptions herein are intended as illustrative, and not as limiting, and that variations in the embodiments can be made without departing from the spirit of the invention. Accordingly, the foregoing descriptions are intended as illustrative, and not as limiting.

We claim:

1. A computer game system comprising:

an application server capable of initiating a competitive video game for multiple players;

a game screen, and a wager screen comprising controls that enable a first player to select a wager amount for the competitive video game and contact the application server to initiate the competitive video game, such that when the competitive video game is initiated it is displayed on the game screen to the first player allowing the first player to interact with game play elements to play the competitive video game against at least one opponent player;

wherein the first player, upon winning the game, is awarded with at least a portion of the amount wagered by the at least one opponent; and wherein the game is from a game developer, and at least a portion of the amount wagered by the at least one opponent is awarded to the game developer.

2. The system of claim 1 wherein the application server comprises a detection system operates during the game play to detect whether the first player is a human or a bot.

3. The system for claim 1 further comprising a rank system such that the first player has a player rank, and a match making system that matches the first player with an opponent having a respective ranking that is similar to the ranking of the first player.

4. The system for claim 1 wherein the wager amount is entered as U.S. dollars.

5. The system for claim 1 wherein the wager amount is entered as crypto currency tokens.

6. The system of claim 1 wherein the the application server stores information transmitted by the players during game play for use in detecting cheating.

7. The system of claim 1 wherein the game screen comprises a shooter game.

8. The system of claim 1 wherein the game screen comprises an RPG game.

9. The system of claim 1 wherein the game screen comprises a puzzle game.

10. The system of claim 1 wherein the game screen comprises an action game.

11. A device comprising:

a processor and a display;

wherein the display comprises a game screen comprising, a game screen and a wager screen;

wherein the wager screen comprises controls that enable a first player to select a wager amount for a competitive video game and to contact an application server to initiate a competitive video game with multiple players, such that when the competitive video game is initiated the game screen displays the competitive video game, allowing the player to interact with game play elements to play the competitive video game against at least one opponent player;

wherein the first player, upon winning the game, is awarded with at least a portion of the amount wagered by the at least one opponent; and wherein the game is from a game developer, and at least a portion of the amount wagered by the at least one opponent is awarded to the game developer.

12. The device of claim 11 wherein wherein the application server comprises a detection system operates during the game play to detect whether the player is a human or a bot.

13. The device of claim 11 wherein the first player has a player rank, and a match making system matches the first player with an opponent having a respective ranking that is similar to the ranking of the first player.

14. The device of claim 11 wherein the wager amount is entered as crypto currency tokens.

15. The device of claim 11 wherein the device transmits information during game play to the application server for use in detecting cheating.

16. The device of claim 11 wherein the game screen comprises a shooter game.

17. The device of claim 11 wherein the game screen comprises an RPG game.

18. The device of claim 11 wherein the game screen comprises a puzzle game.

19. The device of claim 11 wherein the game screen comprises an action game.

20. A non-transitory computer-readable medium comprising a set of instructions that when executed by a processor cause the processor to:

display a wager screen comprising controls that enable a first player to select a wager amount for a competitive game and to contact an application server to initiate a competitive video game with multiple players;

upon input from the first player, communicate a request to initiate the competitive video game to an application server, and when the competitive video game is initiated, display a game screen allowing the first player to interact with game play elements to play the competitive video game against at least one opponent player;

such that the first player, upon winning the game, is awarded with at least a portion of the amount wagered by the at least one opponent; and wherein the game is from a game developer, and at least a portion of the amount wagered by the at least one opponent is awarded to the game developer.

* * * * *